(12) United States Patent
Grant

(10) Patent No.: US 10,948,287 B1
(45) Date of Patent: Mar. 16, 2021

(54) WEARABLE DEVICE FOR SPACING AWARENESS

(71) Applicant: Peter Grant, Hollywood, FL (US)

(72) Inventor: Peter Grant, Hollywood, FL (US)

( * ) Notice: Subject to any disclaimer, the term of this patent is extended or adjusted under 35 U.S.C. 154(b) by 0 days.

(21) Appl. No.: 17/083,670

(22) Filed: Oct. 29, 2020

(51) Int. Cl.
| | |
|---|---|
| *G01C 3/08* | (2006.01) |
| *G01P 13/00* | (2006.01) |
| *G01C 3/02* | (2006.01) |
| *G01J 5/08* | (2006.01) |
| *G01J 5/00* | (2006.01) |

(52) U.S. Cl.
CPC .............. *G01C 3/02* (2013.01); *G01J 5/0025* (2013.01); *G01J 5/0806* (2013.01); *G01P 13/00* (2013.01)

(58) Field of Classification Search
CPC .......... G01C 3/08; G01P 13/00; G01J 1/0233; G01S 7/484; G01S 7/4813; G01S 17/04; G08B 21/02; G08B 21/18; G02B 2027/0187; G02F 1/133345; G02F 1/134309; G02F 1/13439; G02F 1/1345; G02F 1/29; G02F 2001/294; G06F 1/163; A61B 5/1112; A61B 5/6824
See application file for complete search history.

(56) References Cited

U.S. PATENT DOCUMENTS

| | | | |
|---|---|---|---|
| 10,075,919 B2 | 9/2018 | Alameh | |
| 2017/0032646 A1 | 2/2017 | Alameh | |
| 2019/0269999 A1* | 9/2019 | Amron | ............... A63B 71/0622 |

* cited by examiner

*Primary Examiner* — David P Porta
*Assistant Examiner* — Fani Boosalis
(74) *Attorney, Agent, or Firm* — Sanchelima & Associates, P.A.; Christian Sanchelima; Jesus Sanchelima

(57) ABSTRACT

A wearable device for spacing awareness including a housing assembly and an electronics assembly is disclosed. The housing assembly includes a housing which includes a lens. The housing includes a securing clip at a rear side to easily attach the housing to a wearer. Within the housing is the electronics assembly. The electronics assembly includes sensors securing within the housing and behind the lens. The sensors being infrared sensors that detect when someone is too close to the wearer through heat detection. The lens help improve the function of the sensors. When the sensors detect a person is too close to the wear a laser beam is emitted. The laser beam indicates how far from the wearer other people must remain so that proper social distancing is achieved. With proper social distancing the likelihood of cross contamination from air borne diseases, bacteria and viruses is reduced.

16 Claims, 4 Drawing Sheets

US 10,948,287 B1

WEARABLE DEVICE FOR SPACING AWARENESS

BACKGROUND OF THE INVENTION

1. Field of the Invention

The present invention relates to a wearable device, more particularly, to a wearable device that helps users to remain aware of spacing between those in the vicinity for proper social distancing to be achieved.

2. Description of the Related Art

Several designs for wearable device for social distancing have been designed in the past. None of them, however, include a wearable device which alerts users with a sound and a vibration when others are too close to the user of the wearable device. The wearable device includes infrared sensors such as PIR sensors to detect others near the user, the infrared sensors are focused with the use of a Fresnel lens. Additionally, a laser beam is emitted once others are detected too close to the user of the wearable device, the laser beam demonstrates to others how far back they must be from the user of the present invention for proper and safe social distancing to be achieved to help avoid cross contamination of germs, viruses or diseases between people.

Applicant believes that a related reference corresponds to U.S. Pat. No. 10,075,919 for a portable electronic device with proximity sensors and identification beacon. Applicant believes that another related reference refers to U.S. published patent application No. 2017/0032646 for an eyewear with proximity sensors to detect outside line of sight presence and corresponding methods. None of these references, however, teach of a wearable device that makes use of infrared sensors to detect others too close to the user to then alert the user of more distancing required between the user and those in the vicinity to the user.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a wearable device that helps to encourage proper social distancing between users and those in the vicinity.

It is another object of this invention to provide a wearable device that helps to increase the safety of users by encouraging social distancing to help reduce the likelihood of cross contamination of germs, disease and viruses between people.

It is still another object of the present invention to provide a wearable device that helps to alert and aware users and those in the vicinity when proper social distancing is not being maintained.

It is also another object of the present invention to provide a wearable device that compact and portable.

It is additionally an object of the present invention to provide a wearable device that helps to detect people in the vicinity of the device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
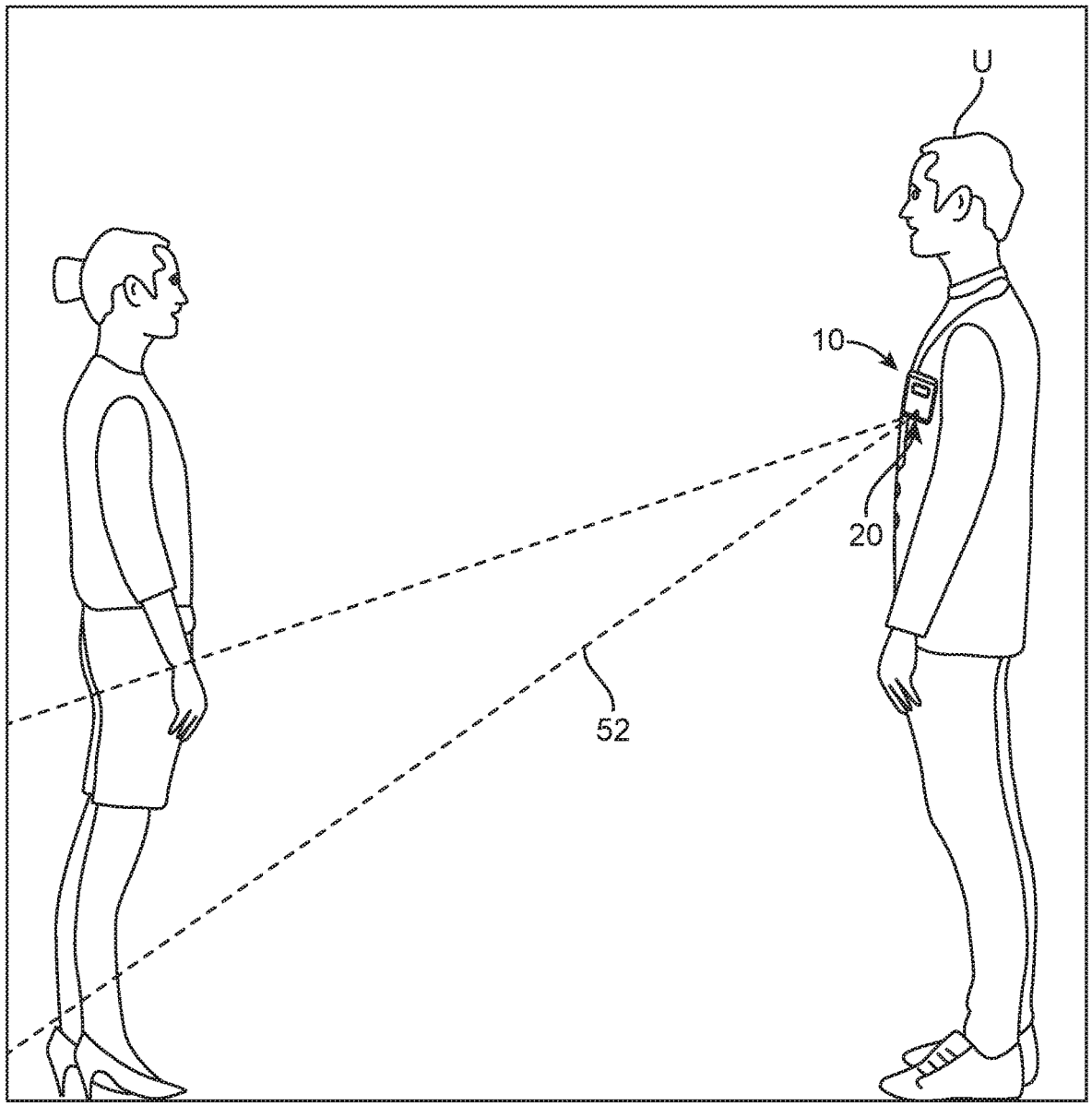
FIG. 1 represents an operational view of wearable device 10 being worn by a user to encourage proper distancing between people.

Referring now to the drawings, where the present invention is generally referred to with numeral 10, it can be observed that it, basically includes a housing assembly 20 and an electronics assembly 40.

A wearable device 10 as best illustrated in FIGS. 1-6, may help to increase the safety of users U by encouraging that a safe social distance be maintained between users U and those in the vicinity to users U. Thereby reducing the likelihood that cross contamination of diseases, viruses or illnesses occur amongst people within a same vicinity. Wearable device 10 may be compact to remain unintrusive to users U wearing the present invention. Additionally, wearable device 10 may alert users U that others are too near to them. The people too near to users U may be informed as to how far back they must step away from users U to maintain the required spacing therebetween. It may be suitable for users U to each wear more than one of wearable device 10. Users U may wear wearable device 10 at a front and rear side of their body to detect others in front or behind them that are too close.

Wearable device 10 may include housing assembly 20. Housing assembly 20 may include a housing 22. It is to be understood that housing 22 may substantially enclose electronics assembly 40 within. Housing 22 may have a rectangular configuration, in one embodiment. Housing 22 may be made of materials such as plastic, rubber, metal, aluminum, wood or the like. It may be preferable for housing 22 to be compact and light weight. Thereby allowing for housing 22 to remain unintrusive when worn by users U.

It can be seen that on a front portion of housing 22 may be secured a lens 24. It is to be understood that underneath of lens 24 may be sensors 46. Lens 24 may help to provide improved functioning of sensors 46 of the present invention that help to detect others near users U. Lens 24 helps to allow for sensors 46 to focus for better detection of people in the vicinity of users U. Lens 24 may provide a short focal length to concentrate light from sensors 46 into a narrow beam. Lens 24 may be preferably be centrally located at a top half of housing 22. Lens 24 may extend a partial length of housing 22. Preferably, lens 24 may be a Fresnel lens which is a composite compact lens.

Housing 22 may include a laser opening 26 for which a laser module 48 can be secured to. It is to be understood that laser opening 26 may be of a shape and dimension that cooperates with the shape and dimension of laser module 48. It is to be understood that laser opening 26 may be on a front of housing 22 underneath of lens 24.

Secured to a rear portion of housing 22 may be an outer casing 28. Outer casing 28 may be seen extending about an entire perimeter of housing 22. Outer casing 28 may preferably have a length and width greater than that of housing 22. Thereby creating a border around of housing 22. In one implementation, outer casing 28 may have rounded corners. Outer casing 28 may include corner cutouts 28a. Corner cutouts 28a may help to keep outer casing 28 lightweight. Corner cutouts 28a may be triangular in one embodiment.

Extending from a rear of outer casing 28 may be a securing clip 32. Securing clip 32 may be used to attach and secure housing 22 onto users U. Securing clip 32 may extend partially along the length and height of outer casing 28. It is to be understood that securing clip 32 may have a closed top perimeter side and all remaining perimeter sides be open. Securing clip 32 may extend outwardly and away from housing 22 and outer casing 28. It is to be understood that securing clip 32 may have a curved configuration. Securing clip 32 may be in an elongated S shaped configuration in the preferred embodiment. Users U may secure housing 22 to a desired surface by securing the desired surface between outer casing 28 and securing clip 32. Pressure may maintain the desired surface secured between securing clip 28 and outer casing 28 which results in housing 22 secured to users U. Users U may slight lift securing clip 32 to release housing 22 and securing clip 32 from the desired surface, such as a shirt of one of users U.

Optionally, securing clip 32 may include clip cutouts 32a. Clip cutouts 32a may help to maintain securing clip 32 lightweight. Clip cutouts 32a may extend vertically and a partial height of securing clip 32. Clip cutouts 32a may have an elongated shaped configuration, in one embodiment. In the preferred embodiment, clip cutouts 32a may be of different varying widths.

Figure 6:
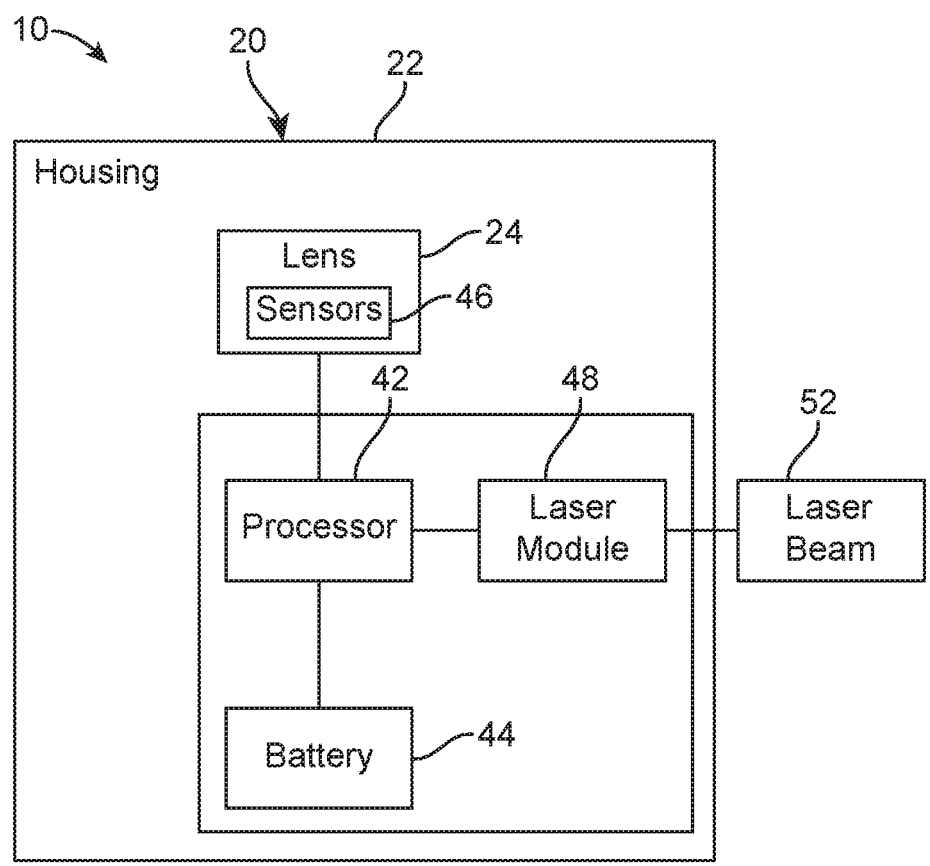
FIG. 6 represents a chart showing the electronics assembly 40 which is within wearable device 10.

Importantly, secured within housing 22 may be electronics assembly 40, as best illustrated in FIG. 6. Electronics assembly 40 may help with detecting people that are too close to users U. Electronics assembly 40 may include a processor 42 which helps components of electronics assembly 40 determine when to execute their assigned task. It may be suitable that a printed circuit board be used to interconnect electronics assembly 40. Processor 42 helps to maintain proper order and function of electronics assembly 40. Secured to processor 42 may be a battery to power processor 42 and all electrical components of electronics assembly 40.

Mounted to processor 42 within housing 22 and underneath of lens 24 may be sensors 46. With lens 24 and sensors 46, wearable device 10 may have a 120-degree angle to detect people in front of wearable device 10. Sensors 46 may preferably be infrared sensors. It may be suitable for sensors 46 to be passive infrared sensors, in one embodiment. Sensors 46 may also be motion detecting sensors. Sensors 46 may detect and measure infrared light or heat radiating from objects such as people in the field of view of sensors 46. That means that sensors 46 may detect when a person has come into the field of view of sensors 46 and is too close to users of the present invention. Sensors 46 help to determine if any person in the vicinity of users U need to step away from the users U to achieve proper social distancing to reduce the chance of cross contamination of diseases, viruses or bacteria. Sensors 46 may extend the length of lens 24. It may be suitable for sensors 46 to be evenly spaced apart and parallel to each other underneath of lens 24. Lens 24 helps to improve the function of sensors 46 so that detection of people around users U is more accurate and useful. Sensors 46 may be better focused during operation due to lens 24.

Figure 2:
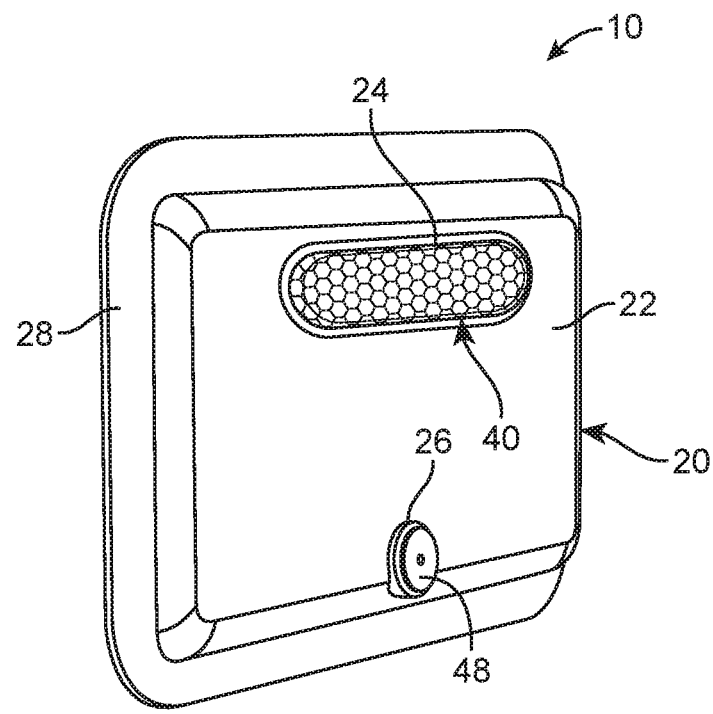
FIG. 2 illustrates an isometric view of the wearable device 10.
Figure 3:
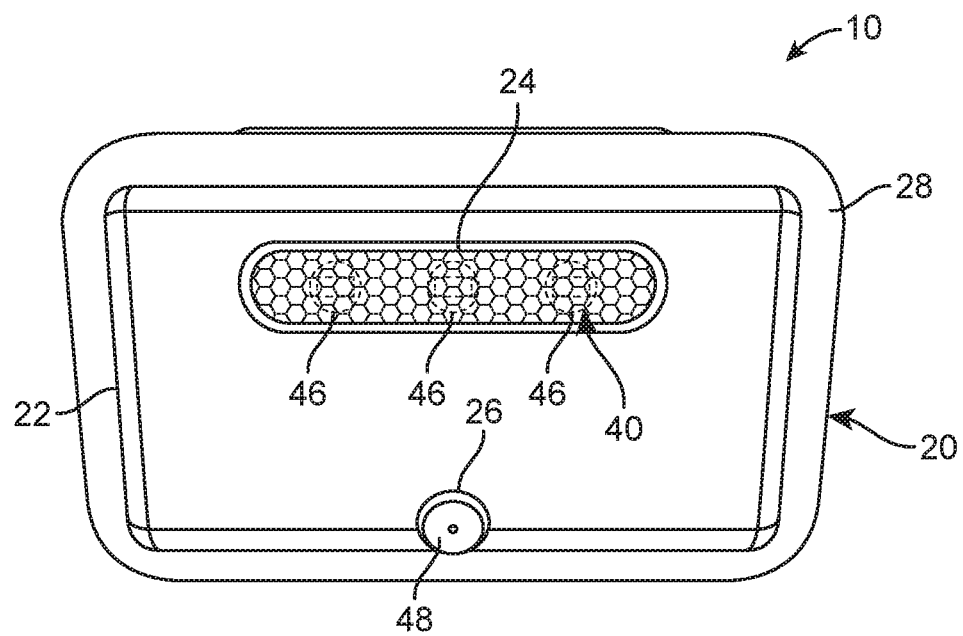
FIG. 3 shows a front view of wearable device 10.
Figure 4:
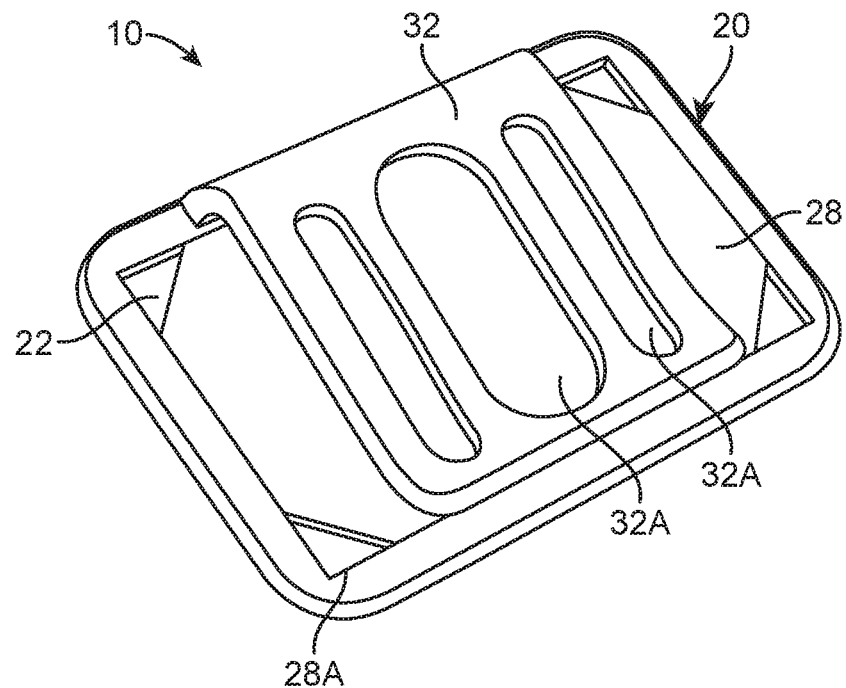
FIG. 4 illustrates a rear view of wearable device 10.
Figure 5:
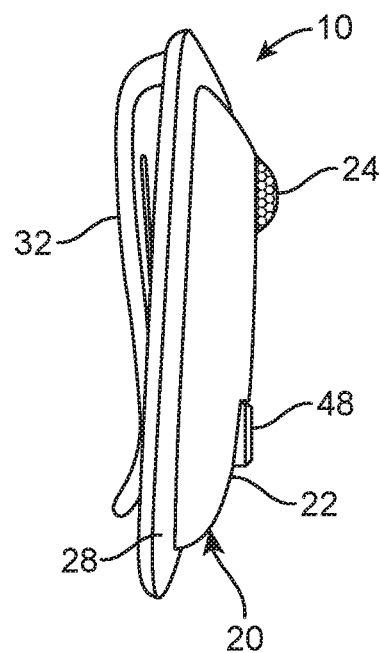
FIG. 5 is a representation of a side view of wearable device 10.

Secured to housing 22 entirely underneath of lens 24 and sensors 46 may be located laser module 48, as best seen in FIGS. 2 and 3. Laser module 48 may be parallel to lens 24. Laser module 48 may be secured to laser opening 26. Laser module 48 may be connected to processor 42 within housing 22. Laser module 48 may protrude outwardly and away from housing 22. Laser module 48 may emit a laser beam 52. Laser beam 52 may automatically be emitted when sensors 46 detect that someone is too closed to users U, within a predetermined distance. Laser beam 52 may preferably be emitted on a ground surface. Laser beam 52 may extend a predetermined distance from housing 22 indicating how far away from users U other people must remain for proper social distancing to be achieved. This helps to reduce the chance of cross contamination for users U from diseases, bacteria or viruses that may be potentially transmitted by other people in the vicinity of users U. In one embodiment, laser beam 52 may constantly be emitted to remind others how far away from users U they are to remain. In one implementation, laser beam 52 may be shut down when sensors 46 determine that no person is too close to wearers or users U of the present invention.

Wearable device 10 may help to remind people that proper distancing is needed amongst them to avoid cross contamination of air borne diseases, bacteria or viruses. Wearable device 10 may detect someone getting too close to users U of wearable device 10. Subsequently, wearable device 10 may emit laser beam 52 to indicate to people in the vicinity how far away from users U they must remain for adequate distancing to be achieved due to safety concerns. This helps to maintain users U healthy. Importantly, wearable device is easily secured to users U and is unintrusive. To further alert users U of others being too close to them, wearable device 10 may include a motor to cause a vibration and a speaker to emit a sound when it is detected that other people are too close to users U instead of maintaining proper social distancing.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a wearable device comprising:
  a) a housing assembly including a housing, said housing including lens, said housing secured to a user; and
  b) an electronic assembly secured within said housing, said electronic assembly including sensors and a laser module, said sensors secured behind said lens to improve the accuracy and function of said sensors, said laser module emitting a laser beam on a ground surface when said sensors detect when a person is within a predetermined distance of said user, said laser beam indicating to said person how far away from said user they are to move away for proper social distancing to be achieved.
2. The system of claim 1, wherein said lens is a Fresnel lens.

3. The system of claim 1, wherein said sensors are passive infrared motion sensors.

4. The system of claim 1, wherein said housing includes a laser opening to receive said laser module.

5. The system of claim 4, wherein said laser module protrudes outwardly and away from said housing through said laser opening.

6. The system of claim 1, wherein said laser module is entirely below said lens and said sensors.

7. The system of claim 1, wherein an outer casing is secured to a rear of said housing.

8. The system of claim 1, wherein said outer casing has a length and height greater than that of said housing.

9. The system of claim 7, wherein said outer casing extends about an entire perimeter of said housing.

10. The system of claim 7, wherein said outer casing includes corner cutouts, said corner cutouts being triangular.

11. The system of claim 7, wherein a securing clip extends from said outer casing, said securing clip attaching said housing to a desired surface on a user.

12. The system of claim 11, wherein said securing clip including clip cutouts.

13. The system of claim 12, wherein said clip cutouts extend vertically and are of different widths.

14. The system of claim 1, wherein said electronics assembly includes a processor to control function and operation of said laser module and said sensors.

15. The system of claim 1, wherein said electronic assembly includes a battery to provide power to said sensors and said laser module.

16. A system for a wearable device comprising:
  a) a housing assembly including a housing, said housing including lens, said lens being Fresnel lens, said housing including an outer casing secured to a rear side thereof, said outer casing extending about an entire perimeter of said housing as said outer casing includes a length and height greater than that of said housing, said outer casing including a securing clip, said securing clip being curved, said housing secured to a user with said securing clip; and
  b) an electronic assembly secured within said housing, said electronic assembly including sensors, a laser module, and a battery, said sensors secured behind said lens to improve the accuracy and function of said sensors, said laser module emitting a laser beam on a ground surface when said sensors detect a person is within a predetermined distance of said user, said laser beam indicating to said person how far away from said user they are to move away for proper social distancing to be achieved, said battery powering said sensors and said laser module.

* * * * *